US008910087B2

(12) United States Patent
Liu et al.

(10) Patent No.: US 8,910,087 B2
(45) Date of Patent: Dec. 9, 2014

(54) METHOD AND ELECTRONIC DEVICE CAPABLE OF SEARCHING AND DISPLAYING SELECTED TEXT

(75) Inventors: Te-Jia Liu, Shenzhen (CN); Chih-San Chiang, New Taipei (TW); Hai-Sen Liang, Shenzhen (CN); Hai-Jun Mao, Shenzhen (CN); Hua-Dong Cheng, Shenzhen (CN); Han-Che Wang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 376 days.

(21) Appl. No.: 13/304,389

(22) Filed: Nov. 24, 2011

(65) Prior Publication Data

US 2013/0091474 A1   Apr. 11, 2013

(30) Foreign Application Priority Data

Oct. 11, 2011 (CN) .......................... 2011 1 0305748

(51) Int. Cl.
*G06F 3/033* (2013.01)
*G06F 3/041* (2006.01)
*G06F 17/30* (2006.01)
*G06F 3/0488* (2013.01)

(52) U.S. Cl.
CPC ........ *G06F 3/0488* (2013.01); *G06F 17/30716* (2013.01); *Y10S 715/968* (2013.01)
USPC ............................ 715/863; 715/234; 715/968

(58) Field of Classification Search
CPC ... G06F 3/017; G06F 3/0488; G06F 3/04883; G06F 2203/04808
USPC .......................................... 715/234, 863, 968
See application file for complete search history.

(56) References Cited

U.S. PATENT DOCUMENTS

| 2013/0085843 A1* | 4/2013 | Dyor et al. ................. 705/14.49 |
| 2013/0085855 A1* | 4/2013 | Dyor et al. ................. 705/14.55 |
| 2013/0103712 A1* | 4/2013 | Li et al. ......................... 707/769 |
| 2013/0104090 A1* | 4/2013 | Yu et al. ......................... 715/863 |

FOREIGN PATENT DOCUMENTS

| CN | 102096721 A | 6/2011 |
| TW | 200701016 A | 1/2007 |

OTHER PUBLICATIONS

Office 2010, Search or move around in a document using the navigation pane, published by office.microsoft.com in Jun. 26, 2010, pp. 1-3.*

* cited by examiner

*Primary Examiner* — Stephen Hong
*Assistant Examiner* — Ahamed I Nazar
(74) *Attorney, Agent, or Firm* — Novak Druce Connolly Bove + Quigg LLP

(57) ABSTRACT

An electronic device includes a storage unit, a touch display unit and a central processing unit. The central processing unit includes a control module, a searching module, and a spit-screen module. The control module generates a first window on the touch display unit to display a text document when the text document is opened, and determines a selected text of the displayed text document by a user according to touch positions when the touch display unit is touched. The searching module searches occurrences of the selected text in the text document, and the control module stores the searched text in the storage unit. The spit-screen module displays each occurrence of the selected text on a second window produced thereby with a size thereof smaller than that of the first window. A related method is also provided.

12 Claims, 5 Drawing Sheets

30

Avionics displays provide critical flight information to aircraft pilots. It is expected that such displays are readable under a variety of lighting conditions. At one extreme, displays must be readable in fall ▓▓▓▓ conditions as well as at the other extreme, in comp[       ]n changes in the int[when the general] conditions may o[cockpit lighting is] the general cockp[turned on or off or] on or off or when[when clouds block] sunlight. An appr[direct daylight. An] backlight illumina[appropriate amount of backlight] tion is required to

1/12

4/200

31

FIG. 3 illumination. In dark ambient light conditions, low levels of backlight may be appropriate, such as 0.1 fL (foot Lamberts), whereas as in bright ambient light conditions, greater levels of light generation, such as 200 fL, are appropriate. Once the level is determined, may impact the amount actually generated.

One factor is temperature electrical components variations of components can be caused by ambient cockpit temperature changes or heat generated during use of

3/200 illumination is required to ensure consistent, readable avionics displays under a variety of changing daylight conditions.

METHOD AND ELECTRONIC DEVICE CAPABLE OF SEARCHING AND DISPLAYING SELECTED TEXT

BACKGROUND

1. Technical Field

The present disclosure relates to electronic devices, and particularly, to an electronic device capable of searching and displaying selected text, and a method employed by the electronic device.

2. Description of the Related Art

Electronic devices, such as electronic book readers, with electronic documents (e.g., digital images, digital texts) reading functions are capable of searching a target content in an electronic document which is read by users, and marking the searched target content to be displayed in different state, such as different colors, relative to the other content of the electronic document. Due to the target content being distributed in different pages of the electronic device, in order to know the location or the context of the target content, users should flip through the pages of the electronic document to find the target content with different status, thus the current reading progress of user is interrupted.

BRIEF DESCRIPTION OF THE DRAWINGS

The components in the drawing are not necessarily drawn to scale, the emphasis instead being placed upon clearly illustrating the principles of the disclosure. Moreover, in the drawings, like reference numerals designate corresponding parts throughout the several views.

FIG. 3 is a schematic view showing a user interface provided by the electronic device of FIG. 1 to show a prompt message, in accordance with an exemplary embodiment.

FIG. 4 is a schematic view showing a user interface provided by the electronic device of FIG. 1 to show the text document read currently and the searched selected text on the same page, in accordance with an exemplary embodiment.

DETAILED DESCRIPTION

Figure 1:
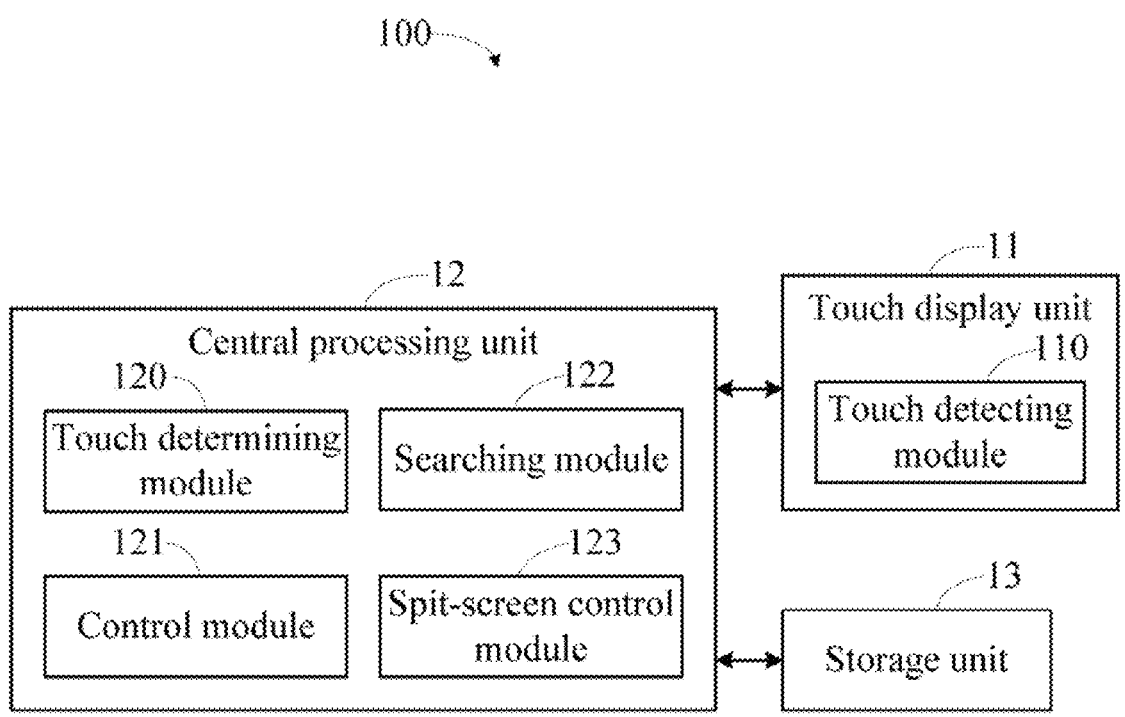
FIG. 1 is a block diagram of an electronic device capable of searching and displaying selected text in accordance with an exemplary embodiment.

FIG. 1 is a block diagram of an electronic device 100 capable of searching and displaying selected text. The electronic device 100 includes a touch display unit 11, a central processing unit 12, and a storage unit 13. The electronic device 100, which has electronic documents reading function, can be a PDA or E-book reader, for example.

The storage unit 13 stores a variety of text documents. The text documents may include, but are not limited to, audio files, videos files, digital images, texts. The central processing unit 12 includes a touch determining module 120, a control module 121, a searching module 122, and a split-screen control module 123.

The touch display unit 11 includes a touch detecting module 110 generating touch signals in response to a touch by a user on the touch display unit 11. The touch determining module 120 determines touch positions according to the touch signals generated by the touch detecting module 110. The control module 121 generates a first window on the touch display unit 11 to display a text document when a text document is opened, determine a selected text of the displayed text document by a user according to the touch positions determined by the touch determining module 120, and marks the target content in different state, such as in darker color.

The searching module 122 searches occurrences of the selected text in the displayed text document in the storage unit 13 according to the selected text determined by the control module 121. The control module 121 further stores the searched text in the storage unit 13 in a temporary document. In the embodiment, the occurrences of the selected text are stored in a searching sequence.

Figure 2:
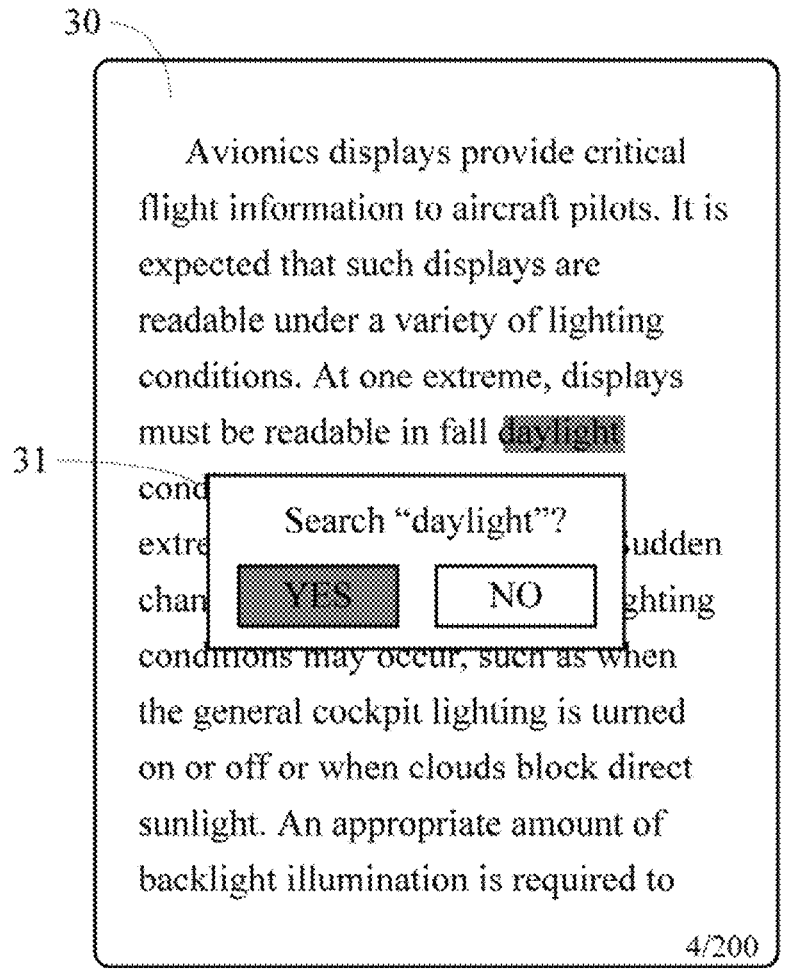
FIG. 2 is a schematic view showing a user interface provided by the electronic device of FIG. 1 to show text document read currently and searched selected text at the same page, in accordance with an exemplary embodiment.

Referring to FIG. 2, in the embodiment, when the selected text is determined, the control module 121 generates a prompt message to prompt a user to determine whether to search the selected text. For example, the control module 121 may display a dialog box to show the prompt message on the touch display unit 11. When the selection of the user is to search for the selected text, the control module 121 produces a searching signal to control the searching module 122 to search the occurrences of the selected text in response to the selection of the user. Otherwise, when the selection of the user is not to search the occurrences of the selected text, the control module 121 does not produce the searching signal in response to the selection of the user.

The spit-screen control module 123 displays a second window on the first window with a size thereof is smaller than that of the first window when the searched text of the selected text is stored in the storage unit 13. The control module 121 obtains the searched text of the selected text from the storage unit 13 and displays each occurrence of the selected text on the second window. In the embodiment, the first window covers the screen area of the touch display unit 11. The second window is displayed on the first window, and the part of the content of the first window under the second window is covered by the second window.

Referring to FIGS. 3 and 4, when the first window and the second window are both displayed on the touch display unit 11, the text document displayed on the first window 30 and the second window 31 can be operated separately, such as page turning, page dragging, for example. When the touch display unit 11 is touched, the touch determining module 120 determines the touch positions based on the touch signals generated by the touch detecting module 110. The control module 121 determines whether the touch is on the first window or the second window according to the touch position. When the touch is on the first window 30, the control module 121 updates the content displayed on the first window 30 in response to the touch. When the touch is on the second window 31, the control module 121 display next occurrence of the selected text on the second window 31 in response to the touch. For example, a drag operation on the first window 30 causes the content in the first window to be move following the drag operation, and a drag operation on the second window 31 causes the content in the second window to be move following the drag operation.

Figure 5:
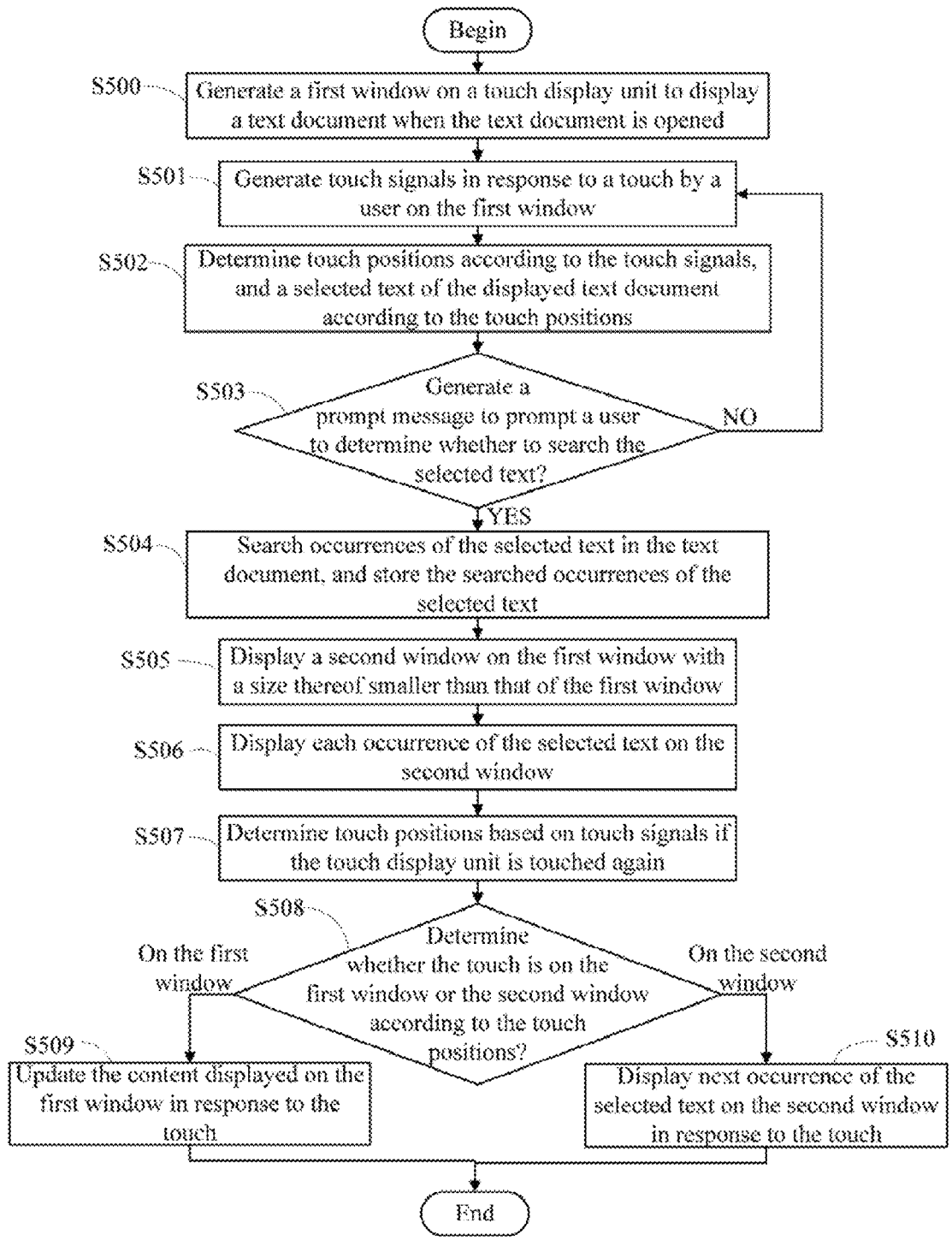
FIG. 5 is a flow diagram that describes steps in a method in accordance with an exemplary embodiment.

FIG. 5 is a flowchart illustrating a method capable of searching and displaying selected text on the electronic device 100 in accordance with an exemplary embodiment.

In step S500, the control module 121 generates the first window on the touch display unit 11 to display the text document when the text document is opened.

In step S501, the touch detecting unit 110 generates touch signals in response to the touch by a user on the first window displayed on the touch display unit 11.

In step S502, the touch determining module 120 determines the touch positions according to the touch signals generated by the touch detecting module 110, and the control module 121 determines the selected text of the displayed text document according to the touch positions determined by the touch determining module 120.

The control module 121 further marks the target content in different state, such as in darker color.

In step S503, the control module 121 generates the prompt message to prompt a user to determine whether to search the selected text. For example, the control module 121 may display a dialog box to show the prompt message on the touch display unit 11. If yes, the process goes to step S504, otherwise, the process returns to step S501.

In step S504, the control module 121 controls the searching module 122 to search the occurrences of the selected text in the text document, and stores the searched text in the storage unit 13.

In step S505, the spit-screen control module 123 displays the second window on the first window with a size thereof smaller than that of the first window.

In step S506, the control module 121 obtains the searched text from the data storage 13, and displays each occurrence of the searched selected text on the second window. In the embodiment, the first window covers the screen of the touch display unit 11. The second window is displayed on the first window, and the part of the content of the first window under the second window is covered by the second window.

In step S507, when the touch display unit 11 is touched again, the touch determining module 120 determines the touch position based on the touch signals generated by the touch detecting module 110.

In step S508, the control module 121 determines whether the touch is on the first window or the second window according to the touch positions. If yes, the process goes to step S509, otherwise, the process goes to step S510.

In step S509, the control module 121 updates the content displayed on the first window in response to the touch.

In step S510, the control module 121 displays next occurrence of the selected text on the second window in response to the touch.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a storage unit configured to store text documents;
   a touch display unit configured to display the text documents, the touch display unit comprising a touch detecting module configured to generate touch signals in response to a touch by a user on the touch display unit; and
   a central processing unit comprising:
   a touch determining module configured to determine touch positions according to the touch signals generated by the touch detecting module;
   a control module configured to generate a first window on the touch display unit to display a text document, and determine a selected text of the displayed text document by a user according to the touch positions determined by the touch determining module, and to generate a prompt message to prompt the user to determine whether to search the selected text;
   a searching module configured to search occurrences of the selected text in the text document if the user determines to search the selected text, the control module configured to store the searched text in the storage unit; and
   a spit-screen control module configured to display a second window a whole of which being overlapped on the first window with a size thereof is smaller than that of the first window when the searched text of the selected text is stored in the storage unit, the control module configured to display each occurrence of the selected text on the second window.

2. The electronic device as recited in claim 1, wherein the control module is further configured to display a dialog box to show the prompt message on the touch display unit.

3. The electronic device as recited in claim 1, wherein the control module is further configured to mark the selected content in different state.

4. The electronic device as recited in claim 1, wherein the searched text is stored in a temporary document in the storage unit.

5. The electronic device as recited in claim 1, wherein the first window covers the screen area of the touch display unit, the second window is displayed on the first window, and the part of the content of the first window under the second window is covered by the second window.

6. The electronic device as recited in claim 1, wherein when the first window and the second window are both displayed on the touch display unit, the touch determining module determines touch positions based on touch signals generated by the touch detecting module when the touch display unit is touched again, the control module determines whether the touch is on the first window or the second window.

7. The electronic device as recited in claim 5, wherein the control module is configured to update the content displayed on the first window in response to the touch if the touch is on the first window; and the control module is configured to display next occurrence of the selected text on the second window in response to the touch if the control module determines the touch is on the second window.

8. A method for searching and displaying selected text on a touch display device comprising:
   (1) generating a first window to display a text document;
   (2) generating touch signals in response to a touch by a user on the first window;
   (3) determining the touch positions according to the touch signals, and determining selected text of the displayed text document according to the touch positions, and generating a prompt message to prompt a user to determine whether to search the selected text;
   (4) searching occurrences of the selected text in the text document if the user determines to search the selected text, and storing the searched text;
   (5) displaying a second window a whole of which being overlapped on the first window with a size thereof smaller than that of the first window; and
   (6) displaying each occurrence of the selected text on the second window.

9. The method as recited in claim 8, further comprising returning to the step (2) if the user determines not to search the selected text.

10. The method as recited in claim 8, wherein the prompt message is showed on a dialog box displayed on the first window.

11. The method as recited in claim 8, wherein the searched text is stored in a temporary document.

12. The method as recited in claim 8, further comprising:
   determining touch positions based on touch signals if the touch display unit is touched again;

determining whether the touch is on the first window or the second window according to the touch positions; and when the touch is determined to be on the first window, updating the content displayed on the first window in response to the touch; and when the touch is determined to be on the second window, displaying next occurrence of the selected text on the second window in response to the touch.

\* \* \* \* \*